(12) United States Patent
Breau et al.

(10) Patent No.: US 8,059,649 B1
(45) Date of Patent: Nov. 15, 2011

(54) MAXIMUM TRANSMISSION SIZE PATH DISCOVERY

(75) Inventors: Jeremy Richard Breau, Kansas City, MO (US); Robert Jolin Pierce, Leesburg, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1152 days.

(21) Appl. No.: 11/780,009

(22) Filed: Jul. 19, 2007

(51) Int. Cl.
*H04L 12/56* (2006.01)
(52) U.S. Cl. .................................... 370/392; 370/401
(58) Field of Classification Search .................. None
See application file for complete search history.

(56) References Cited

U.S. PATENT DOCUMENTS

| 2006/0233175 | A1* | 10/2006 | Ge et al. | 370/392 |
| 2008/0159150 | A1* | 7/2008 | Ansari | 370/238 |

OTHER PUBLICATIONS

Xiaorui Kou et al., "Discovering IPv6 Network Topology," Proceedings of ISCIT2005, 2005 IEEE, University of Information Engineering, Zhengzhou, China, pp. 1275-1278.
Lorenzo Colitti et al., "Discovering IPv6-in-IPv4 Tunnels in the Internet," 2004 IEEE, Dipartimento di Informatica e Automazione, Universita di Roma Tre, Roma, Italy, pp. 613-626.
M. Samad et al., "Deploying Internet Protocol Version 6 (IPv6) Over Internet Protocol Version 4 (IPv4) Tunnel," 2002 Student Conference on Research and Development Proceedings, Shah Alam, Malaysia, 2002 IEEE, pp. 109-112.
Li-Wei Huang et al., "Hierarchical Mobility Management in IPv4/IPv6 Co-existed Networks," 2005 International Conference on Wireless Networks, Communications and Mobile Computing, 2005 IEEE, pp. 1023-1028.
Kai Wang et al., "DTTS: A Transparent and Scalable Solution for IPv4 to IPv6 Transition," Center for Internet Research, School of Computing, National University of Singapore, 2001 IEEE, pp. 248-253.
Yong Cui et al., "The Transition to IPv6, Part II, The Softwire Mesh Framework Solution," IEEE Internet Computer Society, Sep./Oct. 2006, pp. 76-80.
Jaehoon Jeong et al., "Dynamic Tunnel Management Protocol for IPv4 Traversal of IPv6 Mobile Network," 2004 IEEE, Protocol Engineering Center, ETRI, Daejeon, Korea, pp. 4754-4757.
J McCann et al., "Path MTU Discovery for IP Version 6," RFC 1981, Aug. 1996, pp. 1-15.

* cited by examiner

*Primary Examiner* — Chirag Shah
*Assistant Examiner* — Salvador E Rivas

(57) ABSTRACT

A method, medium, and communication system are provided for preventing fragmentation when tunneling between a first and second communication network. The communication system includes nodes and routers that transmit packets over the first and second communication networks. The nodes generate requests to identify the maximum transmission sizes of the first and second communication networks. In turn, the nodes format packets based on the minimum of the maximum transmission sizes of the first and second communication networks. The routers transmit the packets formatted by the nodes over the first and second communication networks without fragmenting the packets.

16 Claims, 4 Drawing Sheets

MAXIMUM TRANSMISSION SIZE PATH DISCOVERY

INTRODUCTION

Currently, internet protocol version six (IPv6) networks are operational and hope to replace existing internet protocol version four (IPv4) networks. IPv6 networks are few in number when compared to the existing IPv4 networks. A large majority of the packets utilized to transmit information are configured to traverse the IPv4 networks. Generally, the packets configured to traverse the IPv4 networks are not able to traverse the IPv6 networks without further processing. Similarly, packets configured to traverse the IPv6 networks are not able to traverse the IPv4 networks without further processing. Due to the lack of internetworking between IPv6 and IPv4 networks, islands are created where all IPv6 packets traverse only the IPv6 network and all IPv4 packets only traverse IPv4 networks.

To facilitate communication across IPv6 and IPv4 networks, tunnels are created to internetwork the IPv4 networks and the IPv6 networks. In the tunnel, an IPv6 packet is encapsulated in an IPv4 packet when traversing the IPv4 network or the IPv4 packet is encapsulated in the IPv6 packet when traversing the IPv6 network. Accordingly, IPv6 and IPv4 tunnels increase internetworking across the IPv6 and IPv4 networks. The tunnels may also improve security and increase the number of nodes that can communicate across the IPv6 and IPv4 networks. However, certain IPv6 packets that are tunneled to traverse the IPv4 network may not allow routers in the IPv4 networks to fragment the IPv6 packets encapsulated in the IPv4 network and may be discarded by the routers in the IPv4 network. The routers in the IPv4 networks that provide the ability to process large IPv4 packets via fragmentation discard the encapsulated IPv6 packets due to IPv4 packet size limits within the IPv4 network.

SUMMARY

The present invention is defined by the claims below. Embodiments of the present invention solve at least the above problems by providing a wireless system, a method, and computer-readable media for, among other things, preventing fragmentation when tunneling between a first communication network and a second communication network. The present invention has several practical applications in the technical arts including internetworking the first and second communication networks without fragmentation, providing path discovery on the first and second communication networks to identify a minimum of the maximum transmission sizes associated with the first and second communication networks, and formatting packets according to the minimum of the maximum transmission sizes for transmission across the first and second communication networks.

In a first aspect, a set of computer-useable instructions provide a method to prevent fragmentation in a communication tunnel. In accordance with the instructions, a dual stack router configured with a first communication protocol of a first network and a second communication protocol of a second network, receives over the first communication network a packet having a payload. When the payload is greater than the maximum transmission size of the first communication network, a response that indicates the maximum transmission size is generated and transmitted to a node that generated the packet having the payload. In turn, a request to transmit a packet over the second communication network, having a payload that is equal to the maximum transmission size of the first communication network is generated by the dual stack router. When the payload of the packet is greater than the maximum transmission size of the second communication network, a response to the packet having a payload that is equal to the transmission size of the first communication network is received by the dual stack router. The response includes a maximum transmission size of the second network. The dual stack router provides the maximum transmission size of the second communication network to the node, which formats and transmits packets across the first and second communication networks without fragmentation. The transmitted packets include payloads less than or equal to the maximum transmission size of the second communication network less a header size of the second communication network.

In a second aspect, a communication system includes a first communication network having routers and nodes, a second communication network having routers and nodes, and one or more dual stack routers configured to connect the first and second communication networks. The dual stack routers are configured to perform path discoveries on the first and second communication networks to identify a minimum of the maximum transmission sizes on the first and second communication networks.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
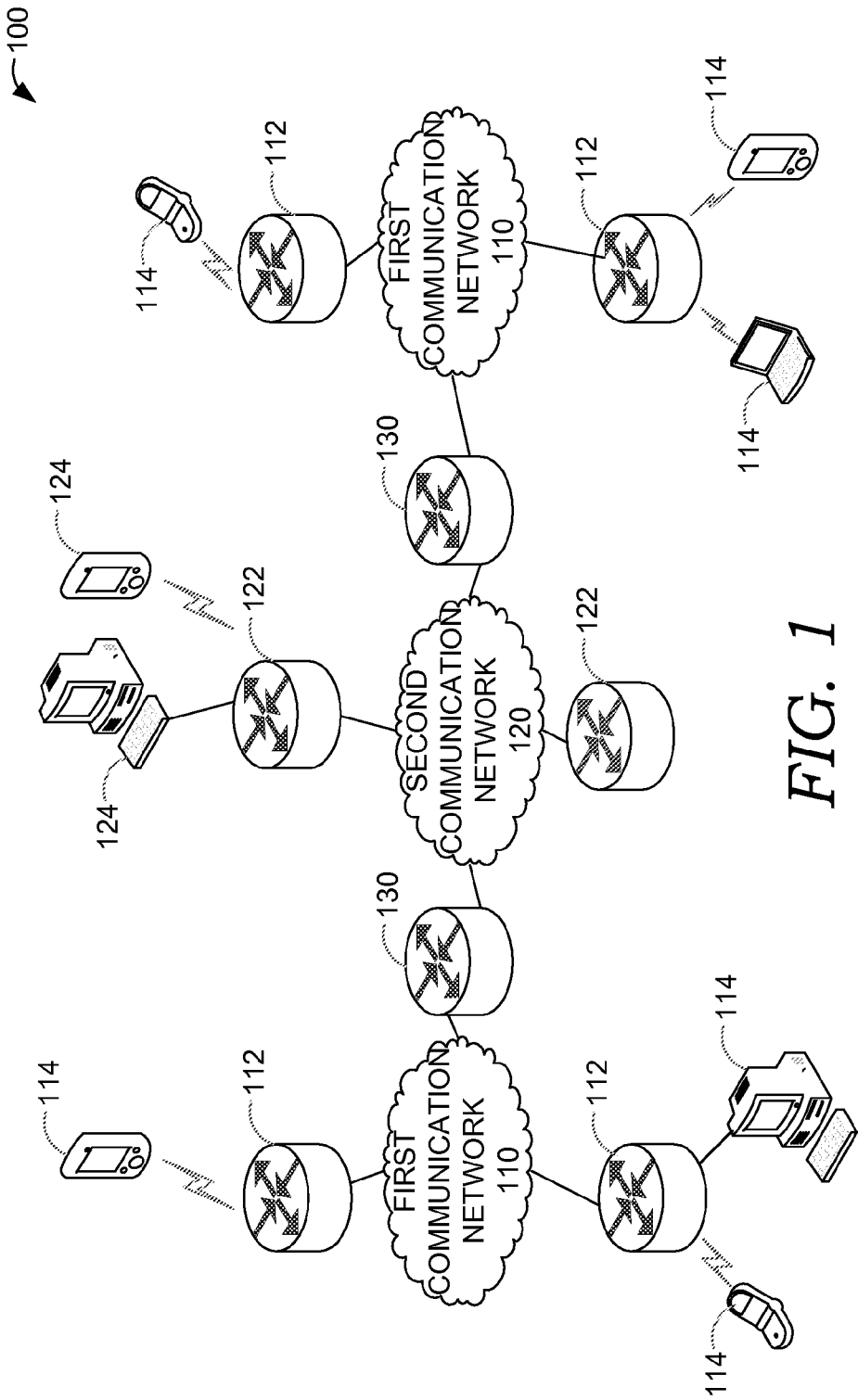
FIG. 1 is an exemplary network diagram that illustrates a communication system.

Embodiments of the present invention provide methods, media, and communication systems for preventing fragmentation. The communication systems include dual stack routers which implement a first communication network and a second communication network. Upon receiving a path discovery, for the first communication network, to identify the maximum transmission size on an interface connected to the first communication network, the dual stack routers may trigger a path discovery on a another interface connected to the second communication network to identify the maximum transmission size on the second communication network. The path discoveries executed by the dual stack routers are utilized to identify a transmission size for packets created on the first communication network, which may be tunneled across a second communication network, based on a minimum of the maximum transmission sizes of the first and second communication networks. Accordingly, the dual stack routers may prevent fragmentation of packets that are transmitted along the first and second communication networks.

Acronyms and Shorthand Notations

Throughout the description, several acronyms and shorthand notations are used to aid the understanding of certain concepts. These acronyms and shorthand notations are solely intended for the purpose of providing an easy methodology of communicating the ideas expressed herein and in no way limit the scope of the claims that follow. The following is a list of these acronyms:

| | |
|---|---|
| ICMP | INTERNET CONTROL MESSAGE PROTOCOL |
| IPv4 | INTERNET PROTOCOL VERSION FOUR |
| IPv6 | INTERNET PROTOCOL VERSION SIX |

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As utilized herein, "component" refers to any combination of software, hardware, or firmware.

In some embodiments, a first communication network and second communication network are connected to a dual stack router that routes communication between the first and second communication networks. The dual stack routers identify an appropriate packet size for packets that traverse the first and second networks via path discovery messages. Thus, the packets transmitted by nodes on the first and second communication networks are formatted based on the appropriate packet size identified by the dual stack routers to prevent fragmentation when traversing the first and second communication networks.

FIG. 1 is an exemplary network diagram that illustrates a communication system 100. The communication system 100 includes first communication networks 110, second communication networks 120, and dual stack routers 130. The dual stack routers 130 connect the first communication network 110 and the second communication network 120.

The first communication network 110 may include wireless and wired networks. The first communication network 110 comprises routers 112 and nodes 114. The routers 112 connect the nodes 114. The routers 112 route communications generated by the nodes 114. In certain embodiments, the nodes 114 include mobile devices, personal digital assistants, laptops, and personal computers. The nodes 114 generate packets to communicate information within the first communication network 110 or to the second communication network 120. The first communication network 110 connects to a dual stack router 130 that routes communications generated by nodes 114 of the first communication network 110 to the second communication network 120. In an embodiment, the first communication network 110 may be an IPv6 network, the nodes 114 may be IPv6 nodes, and the routers 112 may be IPv6 routers.

The second communication network 120 may include wireless and wired networks. The second communication network 120 comprises routers 122 and nodes 124. The routers 122 connect the nodes 124. The routers 122 route communications generated by the nodes 124. In certain embodiments, the nodes 124 include mobile devices, personal digital assistants, laptops, and personal computers. The nodes 124 generate packets to communicate information within the second communication network 120 or to the first communication network 110. The second communication network 120 connects to a dual stack router 130 that routes communications generated by nodes 124 of the second communication network 120 to the first communication network 110. In an embodiment, the second communication network 120 may be an IPv4 network, the nodes 124 may be IPv4 nodes, and the routers 122 may be IPv4 routers.

The dual stack routers 130 are configured to implement a first communication protocol associated with the first communication network 110 and a second communication protocol associated with the second communication network 120. The dual stack routers perform path discoveries on the first communication network 110 and the second communication network 120 to determine a maximum transmission size for the first communication network 110 and the second communication network 120. The dual stack routers 130 route communications between the first communication network 110 and the second communication network 120 when the packets carrying the information are appropriately sized.

An artisan of ordinary skill appreciates and understands that the communication system 100 has been simplified and that alternate arrangements are within the scope and spirit of the description.

In some embodiments, the dual stack router performs path discovery on a first communication network and a second communication network to identify a minimum of maximum transmission sizes associated with the first and second communication networks. The minimum of the maximum transmission sizes is sent from the dual stack router to a communication node that desires to tunnel packets from the first communication network across the second communication network via a communication tunnel or vice versa. The communication node utilizes the minimum of the maximum transmission sizes to format the packets prior to transmission via the communication tunnel.

Figure 2:
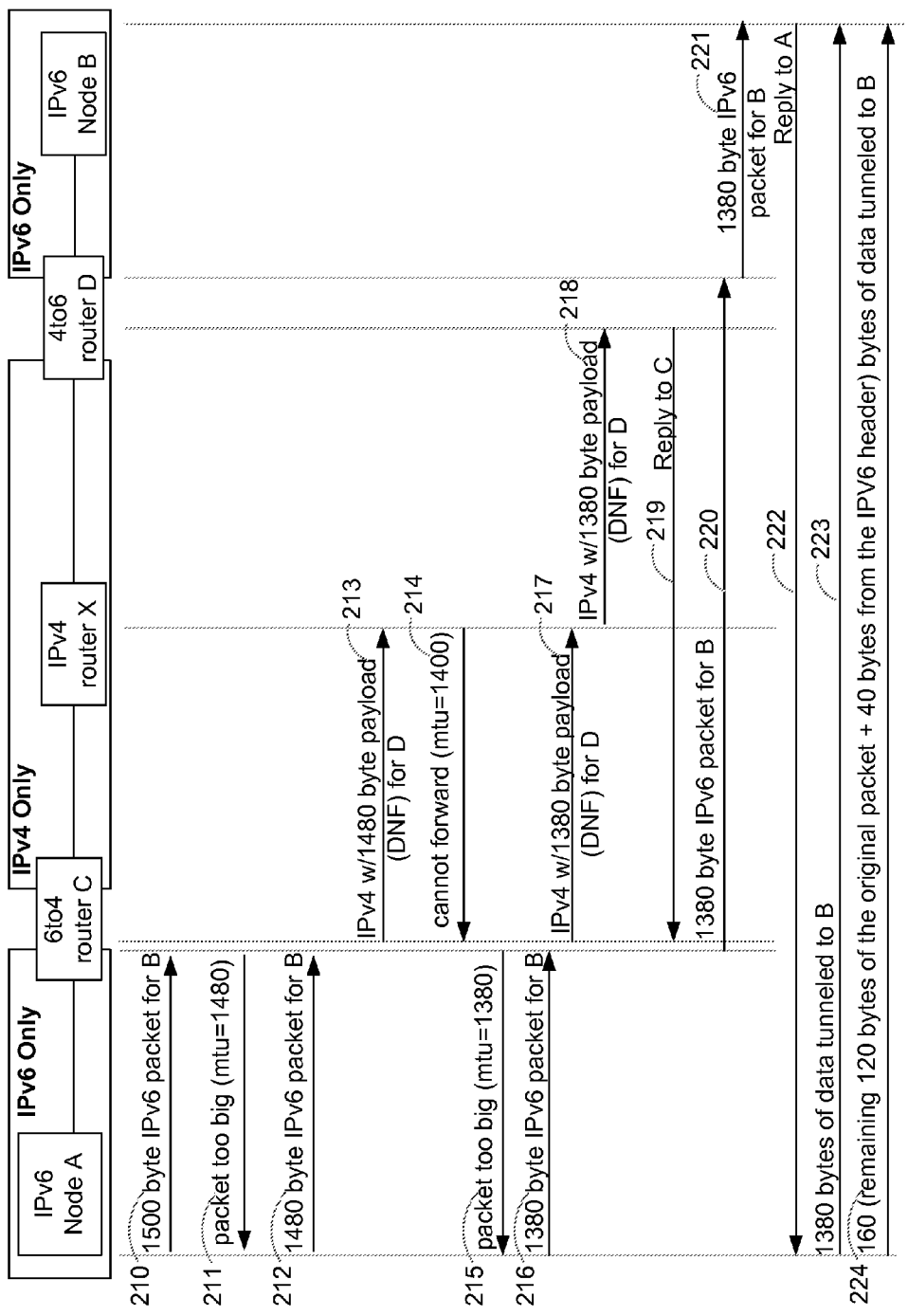
FIG. 2 is an exemplary message diagram that illustrates packets transmitted in a communication tunnel.

FIG. 2 is an exemplary message diagram that illustrates packets transmitted in a communication tunnel. The communication tunnel enables nodes on a first communication network to communicate with nodes on a second communication network. In certain embodiments, IPv6 nodes may communicate with IPv4 nodes or other IPv6 nodes by tunneling packets from the IPv6 network over the IPv4 network.

In an embodiment, node A, an IPv6 node, generates message 210 to communicate with node B another IPv6 node. Message 210 is 1550 bytes. A dual stack router, router C, which connects the IPv6 network and the IPv4 network, receives message 210. Router C generates a path discovery on the IPv6 network to determine a maximum transmission size for the IPv6 network. The maximum transmission size for the IPv6 network is identified as 1480 bytes. Router C stores the maximum transmission size of the IPv6 network. Because the size of message 210 is larger than the maximum size of the IPv6 network, node A is informed, via message 211, that message 210 was not delivered to node B and the maximum transmission size for the IPv6 network is 1480 bytes. Node A utilizes the maximum transmission size for the IPv6 network to reformat the packet requests and transmit message 212 having a size equal to the maximum transmission size of the IPv6 network, 1480 bytes, over the IPv6 network.

Router C receives message 212 over an interface to the IPv6 network. Message 212 is processed by router C to encapsulate the IPv6 message in IPv4 format and to trigger transmitting message 213 to an IPv4 router, router X, which provides a path to node B. The message 213 is an IPv4 packet, which includes a set do-not-fragment flag. The do-not-fragment flag prevents IPv4 routers from fragmenting the packet. Also, message 213 is sized to the size of the maximum transmission size of the IPv6 network.

Router X receives message 213 and performs a path discovery on the IPv4 network to identify the maximum transmission size on the IPv4 network. Router X identifies the maximum transmission size on the IPv4 network to be 1400 bytes. Message 213 is greater than the size of the maximum transmission size of the IPv4 network. In turn, router X generates a response, message 214, to indicate the maximum transmission size of the IPv4 network and notifies router C that message 213 and 212 was not delivered. Router C receives message 214 over the IPv4 interface. Router C stores the maximum transmission size of the IPv4 network. In turn, Router C encapsulates message 214 and generates message 215 to indicate the maximum transmission size of the IPv4 network less a header size of the IPv4 packets and to notify node A that message 212 was not delivered.

Node A receives message 215 and utilizes the maximum transmission size of the IPv4 network less the header size of the IPv4 network to reformat the packets destined for node B and to generate message 216. Message 216 is sized to be 1380 bytes, when the IPv4 header is 20 bytes. Message 216 is processed by router C and encapsulated in message 217, which includes a set do-not-fragment flag. Router X receives message 217 and generates message 218 to forward message 217 to another dual stack router, router D, which responds to router C with message 219 to indicate complete traversal of the IPv4 network on the IPv4 interfaces of the communication tunnel.

In turn, on the IPv6 interface of router C, message 220 is generated and transmitted to the IPv6 interface of router D. Message 220 may be an unencapsulated IPv6 message. Router D receives message 220, generates message 221, and forwards message 221 to node B to ensure node B is alive, reachable, and able to process a packet having the size of the maximum transmission size of the IPv4 network less the header of size of the IPv4 network. Node B receives message 221 and generates a response, message 222, to acknowledge receipt of message 221 via the communication tunnel from node A. In certain embodiments, messages 211-222 are ICMP messages that are part of path discoveries executed by the dual stack routers on the IPv6 and IPv4 networks.

Node A tunnels the 1500 bytes to node B using a maximum transmission size of 1380 bytes. Node A generates two messages: message 223 sized at the maximum transmission size of IPv4 less the header size of IPv4; and message 224 sized at a difference between 1500 bytes and 1380, 120, plus the header size of the IPv6 network. Accordingly, the two messages 223 and 224 traverse the communication tunnel without fragmentation along the IPv6 and IPv4 network when transmitting the 1500 bytes of data from node A to node B.

In some embodiments, a dual stack router is configured with computer-useable instructions that cause the dual stack router to prevent fragmentation on a first communication network and a second communication network. The dual stack router utilizes the maximum transmission sizes to appropriately size packets that traverse the first and second communication networks. In certain embodiments, the packets are sized to prevent fragmentation on the second communication network.

Figure 3:
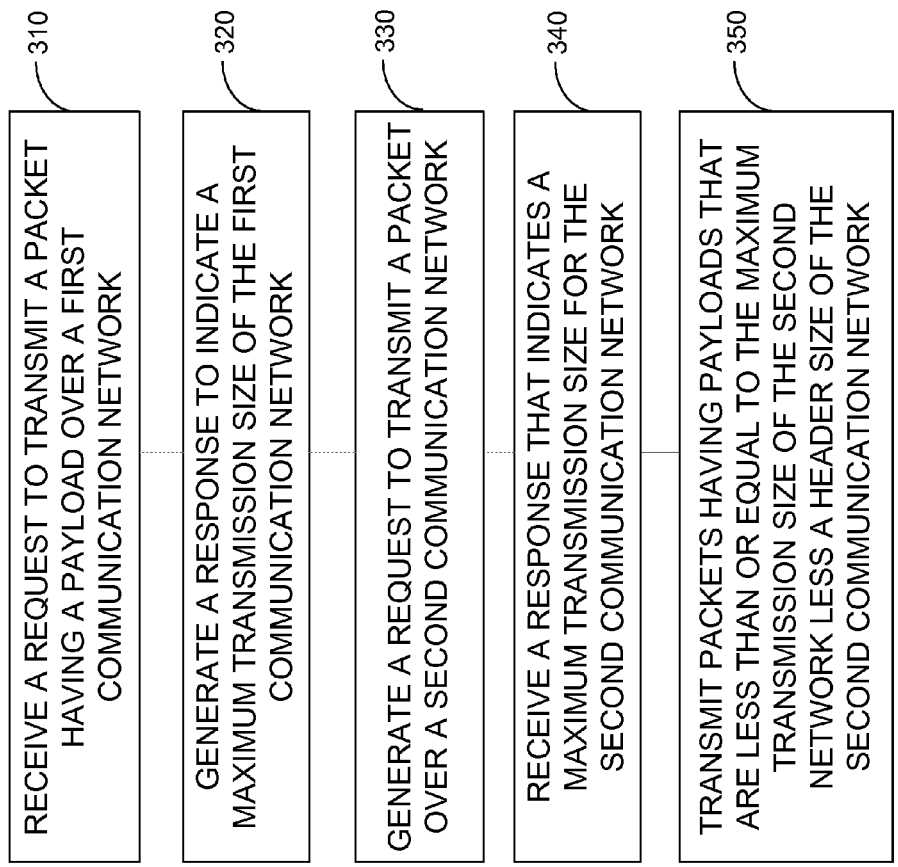
FIG. 3 is an exemplary logic diagram that illustrates a method for preventing fragmentation in a communication tunnel.

FIG. 3 is an exemplary logic diagram that illustrates a method for preventing fragmentation in a communication tunnel. The method is initialized when the dual stack router is powered on. In step 310, the dual stack router receives, over a first communication network, a request to transmit a packet having a payload. The packet may be created by a node on the first communication network and destined for another node on a second communication network. After receiving the packet, the dual stack router performs a path discovery on the first communication network to identify a maximum transmission size for the first communication network. In step 320, the dual stack router generates a response to indicate the maximum transmission size of the first communication network when the payload is greater than a maximum transmission size of the first communication network. In certain embodiments, the path discovery on the first communication network triggers a path discovery on the second communication network. In step 330, the dual stack router generates a request to transmit a packet over a second communication network having a payload that is equal to the maximum transmission size of the first communication network. In turn, the dual stack router receives, over the second communication network, a response that indicates a maximum transmission size for the second communication network, in step 340. In step 350, the dual stack router transmits packets, from the first communication network to the second communication network, having payloads that are, less than or equal to, the maximum transmission size for the second network less a header size of the second communication network. Accordingly, the packets transmitted by the dual stack router are not fragmented on the first and second communication networks.

In another embodiment, the dual stack router is configured with a processor that implements computer-useable instructions to prevent fragmentation by performing path discoveries on the first and second communication network. The path discoveries are triggered by a packet received by the dual stack router. The maximum transmission sizes provided by the path discoveries are utilized to appropriately size the packets on the first communication network and the second communication network.

Figure 4:
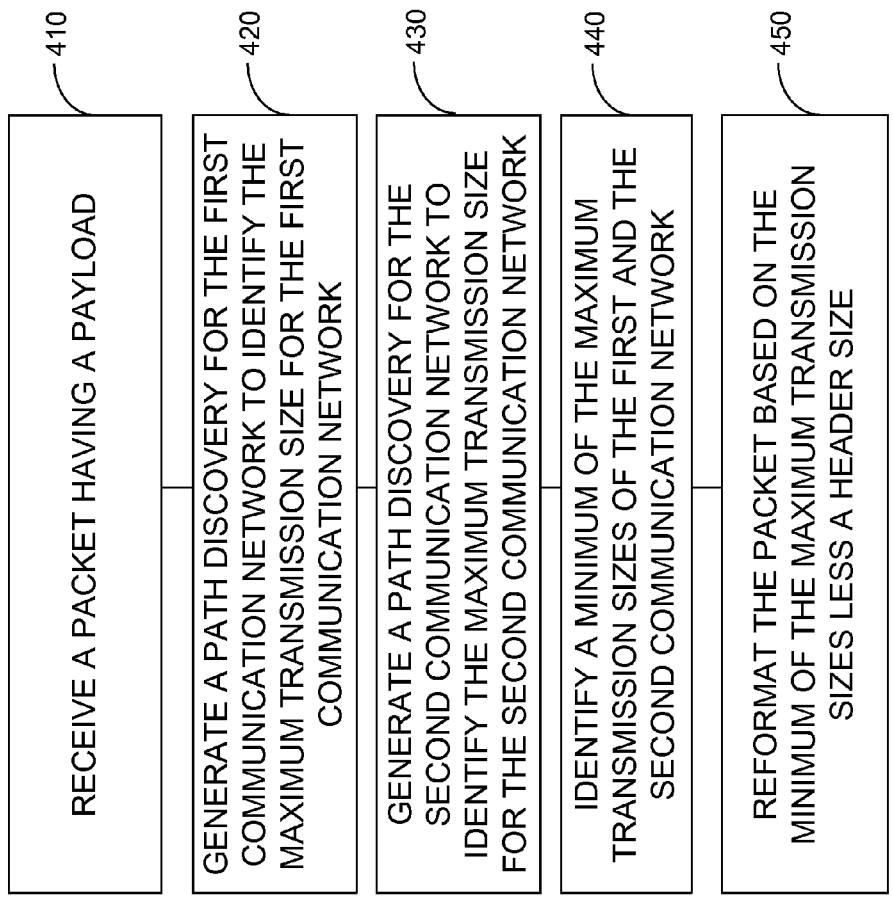
FIG. 4 is another exemplary logic diagram that illustrates another method for preventing fragmentation.

FIG. 4 is another exemplary logic diagram that illustrates another method for preventing fragmentation. The method is initialized when the dual stack router is powered on. In step 410, the dual stack router receives a packet having a payload. In step 420, the dual stack router generates a path discovery for the first communication network to identify the maximum transmission size for the first communication network. In turn, the dual stack router generates a path discovery for the second communication network to identify the maximum transmission size for the second communication network, in step 430. In step 440, the dual stack router identifies a minimum of the maximum transmission size for the first communication network and the maximum transmission size for the second communication network. In step 450, the dual stack router receives reformatted packets based on the minimum of the maximum transmission sizes associated with the first and second communication networks less a header size. Thus, the packets generated by a node based on the minimum of the maximum transmission sizes and transmitted by the dual stack router are not fragmented on the first or second communication networks.

In summary, a communication system is configured with a dual stack router that prevents fragmentation on the first and second communication networks connected to the dual stack router. The packets transmitted by the dual stack router are sized to allow the packets to traverse the first and the second communication networks without fragmentation. Accordingly, the communication tunnels that connect the first and second communication networks transmit the packets generated on the first communication without fragmentation over the second communication network.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method to prevent fragmentation in a communication tunnel, the method comprising:
   receiving, over a first communication network, a request to transmit a packet having a payload;
   generating a response to indicate the maximum transmission size for the first communication network when the payload is greater than a maximum transmission size of the first communication network;
   generating a request to transmit a packet, over a second communication network, having a payload that is equal to the maximum transmission size of the first communication network;
   receiving, over the second communication network, a response that indicates a maximum transmission size for the second communication network; and
   transmitting packets from the first communication network to the second communication network, the packets having payloads that are, less than or equal to, the maximum transmission size for the second network less a header size of the second communication network, wherein the packets are not fragmented on the first and second communication networks.

2. The media of claim 1, wherein a node connected to the first communication network receives the response that indicates the maximum transmission size on the second communication network, formats packets, based on the maximum transmission size of the second communication network, and transmits the packets via the first and second communication network to another node.

3. The media of claim 1, wherein the request to transmit the packet having the payload over the first communication network is a path discovery request for the first communication network.

4. The media of claim 3, wherein the first communication network is an internet protocol version six (IPv6) network.

5. The media of claim 1, wherein the request to transmit the packet over the second communication network is configured with a do-not-fragment flag.

6. The media of claim 5, wherein the request to transmit the packet over the second communication network is a path discovery request for the second communication network.

7. The media of claim 6, wherein the second communication network is an internet protocol version four (IPv4) network.

8. A routing component configured with a processor to perform a method for preventing fragmentation in an internet protocol version six (IPv6) to internet protocol version four (IPv4) tunnel, the method comprising:
   receiving, over an IPv6 network, a request to transmit a packet having a payload;
   generating a response to indicate the maximum transmission size for the IPv6 network when the payload is greater than a maximum transmission size of the IPv6 network;
   generating a request to transmit a packet, over an IPv4 network, having a payload that is equal to the maximum transmission size of the IPv6 network;
   receiving, over the IPv4 network, a response that indicates a maximum transmission size for the IPv4 network; and
   transmitting packets from the IPv6 network to the IPv4 network, the packets having payloads that are, less than or equal to, the maximum transmission size for the IPv4 network less a header size of the IPv4 network, wherein the packets are not fragmented on the IPv4 network.

9. The routing component of claim 8, wherein a node connected to the IPv6 network receives the response that indicates the maximum transmission size on the IPv4 network, formats packets, based on the maximum transmission size of the IPv4 network, and transmits the packets via the IPv6 and IPv4 networks to another node.

10. The routing component of claim 8, wherein the request to transmit the packet having the payload over the IPv6 network is a path discovery request for the IPv6 network.

11. The routing component of claim 8, wherein the request to transmit the packet over the IPv4 is configured with a do-not-fragment flag.

12. The routing component of claim 11, wherein the request to transmit the packet over the IPv4 network is a path discovery request for the IPv4 network.

13. A communication system configured with one or more routers that prevent fragmentation, the communication system comprising:
   a first communication network having routers and nodes, wherein the nodes on the first communication network generate requests to transmit packets over the first communication and second communication networks;
   a second communication network having routers and nodes; and
   one or more routers configured to connect the first and second communication networks and to perform path discoveries on the first and second communication networks to identify a maximum transmission size on the first and second communication networks, wherein the minimum of the maximum transmission sizes provided by the path discoveries are utilized by the nodes to format the packets, the payload of the packet is less than or equal to the maximum transmission size of the second communication network less the header size of the second communication network, and the packets are not fragmented on the first and second communication networks.

14. The communication system of claim 13, wherein the nodes on the first communication network and the second communication network comprise wireless devices, personal digital assistants, laptops, and personal computers.

15. The communication system of claim 13, wherein the first network is an internet protocol version four (IPv4) network and the second network is an internet protocol version six (IPv6) network.

16. The communication system of claim 13, wherein the path discoveries are internet control message protocol (ICMP) messages.

* * * * *